United States Patent [19]

Wert et al.

[11] Patent Number: 5,002,729

[45] Date of Patent: Mar. 26, 1991

[54] CASE HARDENABLE CORROSION RESISTANT STEEL ALLOY AND ARTICLE MADE THEREFROM

[75] Inventors: David E. Wert, West Lawn; Raymond M. Hemphill, Wyomissing, both of Pa.

[73] Assignee: Carpenter Technology Corporation, Reading, Pa.

[21] Appl. No.: 389,503

[22] Filed: Aug. 4, 1989

[51] Int. Cl.$^5$ .............................................. C22C 38/52
[52] U.S. Cl. ..................................... 420/38; 148/319; 148/325; 148/326
[58] Field of Search .................. 420/38; 148/319, 325, 148/326

[56] References Cited

U.S. PATENT DOCUMENTS

| | | |
|---|---|---|
| 964,003 | 11/1977 | Rehrer . |
| 2,590,835 | 4/1952 | Kirkby et al. .......................... 420/38 |
| 3,154,412 | 10/1964 | Kasak et al. ........................... 420/38 |
| 3,316,085 | 4/1967 | Grundman et al. ................... 420/69 |
| 3,663,208 | 5/1972 | Kirby et al. ............................ 420/38 |

FOREIGN PATENT DOCUMENTS 51-41616  4/1976  Japan ...................................... 420/38
853124  11/1960  United Kingdom .

*Primary Examiner*—Deborah Yee
*Attorney, Agent, or Firm*—Dann, Dorfman, Herrell and Skillman

[57] ABSTRACT

This invention provides a case hardening steel alloy and articles made therefrom which, when case hardened and heat treated, have high case hardness, corrosion resistance, high temperature capability and metal-to-metal wear resistance and high core ductility, impact toughness and fracture toughness. The alloy contains about 0.05–0.1 w/o C, 0.04 w/o max. N, 1.5 w/o max. Mn, 1 w/o max. Si, 11–15 w/o Cr, 1–3 w/o Mo, 1.5–3.5 w/o Ni, 3–8 w/o Co, 0.1–1 w/o V, and the balance Fe. In a preferred embodiment, the alloy is balanced according to Equation 1 (Eq.1) so that:

$$3(w/o\ Cr) + 6(w/o\ Si) + 2.5\ (w/o\ Mo) + 6(w/o\ V) - 25(w/o\ C + N) - 6(w/o\ Ni) - 2(w/o\ Mn) - 2(w/o\ Co) - 21 \leq 0.$$

20 Claims, No Drawings

CASE HARDENABLE CORROSION RESISTANT STEEL ALLOY AND ARTICLE MADE THEREFROM

BACKGROUND OF THE INVENTION

This invention relates to a case hardening, corrosion resistant, martensitic steel alloy and articles made therefrom and, more particularly, to such an alloy which, when case hardened and heat-treated, has an outstanding combination of case properties including high hardness with high temperature capability, corrosion resistance and metal-to-metal wear resistance: combined with outstanding core properties including ductility, impact toughness and fracture toughness.

Articles such as bearings and gears which possess a combination of excellent toughness, high temperature capability, and corrosion resistance as well as excellent case hardness and core ductility have been in demand to meet the more exacting operating conditions of aircraft engines and transmissions now under development. Presently known stainless steels, such as those described in U.S. Patent No. 2,590,835, issued to H. W. Kirkby and C. Sykes on April 1, 1952, and in U.S. Pat. No. 3,154,412 issued to A. Kasak et al. on Oct. 27, 1964, do not possess this requisite combination of properties and therefore are unsuitable for use in the fabrication of parts such as aircraft engine bearings.

Recent developments in the design of aircraft jet and turboprop engines and transmissions have placed more stringent demands on parts including bearings and gears; for instance, improvements in engine performance will require such parts to operate under increasingly severe loads and temperatures. Additionally, some new engine designs are more open to the environment than their predecessors, leading to increased risk of corrosion of parts such as bearings due to greater exposure to moisture and, for aircraft used in marine environments, chlorides during shutdown. Thus, a significant problem encountered by the aerospace industry is that engine and transmission bearings and gears fabricated from presently known alloys do not possess the combination of toughness, high temperature capability, and corrosion resistance as well as case hardness and core ductility required of such components by the aircraft designs currently under development.

SUMMARY OF THE INVENTION

It is, therefore, a principal object of this invention to provide a stable martensitic steel alloy which can be prepared, case hardened and heat treated utilizing conventional techniques to provide an outstanding combination of properties including high hardness, high temperature capability, corrosion resistance, and metal-to-metal wear resistance of the case and ductility, impact toughness and fracture toughness of the core.

It is a further object of this invention to provide articles made of such a martensitic steel alloy which, when case hardened and heat treated, have outstanding case properties including high hardness, high temperature capability, corrosion resistance and metal-to-metal wear resistance, and excellent core properties including ductility, impact toughness and fracture toughness.

A more specific object of this invention is to provide such a martensitic steel alloy and articles made therefrom which, when case hardened and heat treated, have an essentially ferrite-free core having a hardness of at least about HRC 35, which at room temperature have a longitudinal Charpy V-notch impact toughness of at least about 60 ft-lb (about 81J, and a fracture toughness of at least about 80 ksi in (about 88MPa combined with a room temperature case hardness of at least about HRC 60, said case also having a hot hardness of at least about HRC 60 at about 400° F. (about 205° C.), good metal-to-metal wear resistance and essentially no retained austenite.

The foregoing objects and advantages of the present invention are largely attained by providing a case hardenable, corrosion resistant alloy as indicated in the broad range in Table I. Further or additional advantages are obtained using the intermediate and preferred ranges in Table I. Best freedom from ferrite is attained by balancing the alloy to satisfy Equation 1 (Eq. 1):

$$3(w/o\ Cr) + 6(w/o\ Si) + 2.5(w/o\ Mo) + \quad (Eq.\ 1)$$
$$6(w/o\ V) - 25(w/o\ C + N) - 6(w/o\ Ni) -$$
$$2(w/o\ Mn) - 2(w/o\ Co) - 21 \leqq 0.$$

Here and throughout this application the term "essentially ferrite-free" and synonymous expressions mean that free ferrite constitutes no more than 5 volume percent (v/o) of the alloy. Case hardened and heat treated articles, made from the present alloy, have a unique combination of case and core properties.

TABLE I

| | w/o | | |
|---|---|---|---|
| | Broad | Intermediate | Preferred |
| C | 0.05–0.1 | 0.06–0.09 | 0.06–0.08 |
| Mn | 1.5 max. | 0.25–1.25 | 0.5–1.0 |
| Si | 1 max. | 0.1–0.7 | 0.2–0.6 |
| Cr | 11–15 | 12–14 | 12.75–13.5 |
| Mo | 1–3 | 1.5–2.5 | 1.5–2.0 |
| Ni | 1.5–3.5 | 2.0–3.0 | 2.25–2.75 |
| Co | 3–8 | 4–7 | 4.75–5.75 |
| V | 0.1–1 | 0.4–0.8 | 0.5–0.7 |
| N | 0.04 max. | 0.002 max. | 0.002 max. |

For all stated ranges, the balance of the alloy is essentially iron, and is preferably at least 70 w/o iron, except for incidental impurities and additions which do not detract from the desired properties. For example, up to about 0.010 w/o phosphorus, up to about 0.005 w/o sulfur, and less than about 0.01 w/o of each of the elements titanium and aluminum are tolerable in the alloy.

The forgoing tabulation is provided as a convenient summary and is not intended thereby to restrict the lower and upper values of the ranges of the individual elements of the alloy of this invention for use solely in combination with each other or to restrict the broad, intermediate, or preferred ranges of the elements for use solely in combination with each other thus, one or more of the broad, intermediate, and preferred ranges can be used with one or more of the other ranges for the remaining elements. In addition, a broad, intermediate, or preferred minimum or maximum for an element can be used with the maximum or minimum for that element from one of the remaining ranges. Throughout this application, unless otherwise indicated, all compositions in percent will be in percent by weight (w/o). Further objects and advantages of the present invention will be apparent from the following detailed description thereof.

DETAILED DESCRIPTION OF THE INVENTION

Carbon is a powerful austenite former and largely contributes to the attainable hardness of the alloy in the hardened condition. To that end at least about 0.05 w/o, preferably 0.06 w/o, carbon is present in this alloy so that the alloy can be balanced so as to contain essentially no free or delta ferrite. When the amount of carbon present is too low, other elements would have to be adjusted to such an extent to preclude free ferrite that the resulting composition would not be suitable for case hardening. Increasing carbon has the undesired effect of reducing the impact toughness and increasing the ductile/brittle transition temperature of the alloy. Therefore, carbon is limited to no more than about 0.1 w/o, better yet to no more than about 0.09 w/o and preferably to no more than about 0.08 w/o. As will be more fully pointed out hereinbelow, carbon and the remaining elements are carefully balanced to ensure the desired essentially ferrite-free composition which is particularly important in the core of a case hardenable alloy.

Nitrogen is also a powerful austenite former and can be substituted on a 1-for-1 basis up to about 0.04 w/o for the larger amounts of carbon contemplated herein. Preferably, nitrogen is kept low in this alloy and no more than about 0.002 w/o is present.

Chromium contributes to the corrosion resistance of this alloy which is particularly advantageous in the case hardened portion of the alloy. For that purpose, at least about 11 w/o, better yet at least about 12 w/o or preferably at least about 12.75 w/o chromium is present. Excessive chromium results in the presence of objectionable free ferrite and retained austenite, and detracts from the wear resistance of the alloy. Therefore, no more than about 15 w/o chromium is present. Better yet no more than about 14 w/o, preferably no more than about 13.5 w/o chromium is present.

Nickel is a strong austenite former, though not as powerful as carbon, or nitrogen, and works to stabilize the alloy against the formation of undesired ferrite. Nickel also contributes to lowering the ductile/brittle transformation temperature and, by reducing the required amount of other austenite-forming elements, e.g., carbon, effectively increases the toughness of the alloy. Nickel also works to permit the addition of larger amounts of ferrite forming elements, such as chromium, molybdenum, and vanadium without upsetting the desired martensitic balance of the alloy. At least about 1.5 w/o, better yet at least about 2.0 w/o and preferably at least 2.25 w/o nickel is present. Increasing nickel above about 3.5 w/o objectionably detracts from the mechanical properties of the alloy and unduly depresses the Ms temperature of the alloy thereby undesirably stabilizing austenite and adversely affecting the formation of the martensitic structure in the alloy. Better yet no more than about 3.0 w/o, preferably no more than about 2.75 w/o nickel is present in this alloy.

Molybdenum enhances the heat and temper resistance of this alloy as well as its corrosion resistance, all of which are important characteristics of this case hardenable alloy. Therefore, the alloy contains a minimum of about 1 w/o, better yet about 1.5 w/o, molybdenum. Above about 3 w/o, molybdenum increases the amount of delta ferrite to an extent as to outweigh its benefits. Better yet, molybdenum is limited to no more than about 2.5 w/o and no more than about 2.0 w/o is preferred.

Cobalt, like nickel, is also an austenite former and helps counterbalance the ferrite forming elements present to reduce the tendency to form ferrite in the alloy so that larger amounts of the ferrite forming elements chromium, molybdenum and vanadium can be present than would otherwise be tolerable. Cobalt also serves to raise the Ms temperature of the alloy thereby reducing the likelihood of retained austenite in the alloy which is particularly disadvantageous when the alloy is case hardened. Thus a minimum of about 3 w/o cobalt, better yet about 4 w/o and preferably about 4.75 w/o is present. Because cobalt is a strategic material the cost of which has varied widely in the past, no more than necessary is present. Thus, though more may be useful, no more than about 8 w/o, better yet no more than about 7 w/o and preferably no more than about 5.75 w/o is present.

Though vanadium is a ferrite former and forms vanadium carbides, both of which tend to increase the ferrite forming potential of the alloy, vanadium is present because it contributes to the fine grain structure and wear resistance of alloy. For these reasons a minimum of about 0.1 w/o, better yet about 0.4 w/o and preferably about 0.5 w/o is present. Because excessive vanadium leads to ferrite being present and to the tieing up of too much carbon, vanadium is limited to no more than about 1 w/o, better yet no more than about 0.8 w/o and preferably no more than about 0.7 w/o vanadium is present.

Though manganese is optional it is usually present in this alloy because it contributes to its austenitic balance. Manganese also depresses the Ms temperature of the alloy. Therefore, no more than about 1.5 w/o may be present in the alloy. A useful range for manganese is about 0.25–1.25 w/o and the preferred composition contains about 0.5–1.0 w/o manganese.

Silicon contributes to the tempered hardness of the alloy but because it is a strong ferrite former must be carefully controlled so as not to upset the balance of the alloy. Therefore, up to about 1 w/o may be present. Though optional, about 0.1–0.7 w/o, preferably about 0.2–0.6 w/o silicon is present.

When making this alloy it is desirable, as is usually the case, to avoid using the minimum amount of austenite-forming elements with the maximum amount of ferrite-forming elements and vice-versa. Best results can be facilitated by using the following equation:

$$3(w/o\ Cr) + 6(w/o\ Si) + 2.5(w/o\ Mo) +$$
$$6(w/o\ V) - 25(w/o\ C + N) - 6(w/o\ Ni) -$$
$$2(w/o\ Mn) - 2(w/o\ Co) - 21 \leqq 0. \quad \text{(Eq. 1)}$$

This alloy is readily prepared by means of conventional, well-known techniques including powder metallurgy. Preferably, for best results, vacuum induction melting (vIM), followed by vacuum arc remelting (VAR) for further alloy refinement is used. After the VIM step the electrode can be stress-relieved at about 1100°–1250° F. (about 595°–675° C.) for 4–16 h, preferably at about 1200° F. (about 650° C.) for 12 h. After the VAR step the ingot is preferably stress-relieved in the same manner. The alloy is forged from a soak temperature of about 1800°–2200° F. (about 980°–1200° C.), preferably about 2050° F. (about 1120° C.), then slowly cooled to room temperature at a rate consistent with the thickness of the material. Preferably annealing should be subcritical, that is, carried out at a temperature below the critical temperature (Acl) of the alloy. The critical temperature of the alloy is readily determinable by well-known techniques. When case-hardening is desired, the alloy may be nitrided or carbonitrided, but is preferably carburized using well-known methods for a time sufficient to secure the desired case depth and hardness. Articles made of the alloy can be hardened by austenitizing at about 1875°–1925° F. (about 1025°–1050° C.), and preferably at about 1900° F. (about 1040° C.), for about 0.25 h plus about an additional 0.1 h for each inch of thickness of the article. Following the austenitizing treatment, the article is quenched. Generally, oil quenching to room temperature is sufficient. However, to prevent the possibility of cracking in intricate articles, such articles are preferably quenched in salt kept at about 800° F. (about 425° C.), allowed to equalize with the salt temperature, and then air cooled to room temperature. Following quenching, the article is deep frozen at about −100° F. (about −73° C.) for about 0.5–1 h to ensure the transformation of essentially all austenite to martensite. The article is then warmed in air to room temperature. For maximum impact toughness, fracture toughness, and corrosion resistance, the article is preferably tempered at about 600° F. (about 315° C.) for about 2 h, air cooled to room temperature, reheated to about 600° F. (about 315° C.), maintained at that temperature for about 2 h, then air cooled to room temperature.

It has been found that the present alloy, when case hardened and heat treated using conventional techniques, exhibits a unique combination of case and core properties including excellent high temperature capability, toughness, and corrosion resistance and a case having high hardness and containing essentially no retained austenite and a very ductile core containing essentially no free ferrite. The alloy may be produced in various forms including billet, bar, rod, and wire. Additionally, the alloy lends itself to use in the fabrication of a wide variety of articles of manufacture including bearings for spacecraft and aircraft engines, bearings and gears for aircraft transmissions, bearings for instruments, and knives requiring a combination of outstanding toughness and corrosion resistance.

EXAMPLE 1

As an example of the present invention, a 400 lb (about 181 kg) heat was vacuum induction melted and cast into a 6 in. (about 15 cm) diameter electrode, stress relieved at 1300° F. (about 705° C.) for 6 h, and then vacuum arc remelted to form an 8 in. (about 20 cm) diameter ingot having the nominal and specific compositions listed in Table II.

TABLE II

| | Ex. 1 | | AISI 4340 | AISI 8620 | AISI 440C |
|---|---|---|---|---|---|
| | Nom. | Spec. | (Nom.) | (Nom.) | (Nom.) |
| C | 0.05–0.1 | 0.07 | 0.40 | 0.20 | 1.10 |
| Mn | * | 0.68 | 0.75 | 0.75 | 1.00 |
| Si | * | 0.39 | 0.25 | 0.25 | 1.00 |
| Cr | 13 | 12.98 | 0.75 | 0.50 | 17.0 |
| Mo | 2 | 1.78 | 0.25 | 0.20 | 0.75 |
| Ni | 2–3 | 2.55 | 1.75 | 0.50 | none |
| Co | 5 | 5.26 | none | none | none |
| V | 0.6 | 0.58 | none | none | none |

TABLE II-continued

| | Ex. 1 | | AISI 4340 | AISI 8620 | AISI 440C |
|---|---|---|---|---|---|
| | Nom. | Spec. | (Nom.) | (Nom.) | (Nom.) |
| Fe | Bal. | Bal. | Bal. | Bal. | Bal. |

*No amount indicated.

With respect to Example 1 (Ex. 1) the balance (bal.) was iron except for incidental impurities which included less than about 0.005 w/o phosphorus, about 0.002 w/o sulfur and about 0.001 w/o nitrogen. To facilitate comparison, the nominal compositions of AISI 4340, 8620, and 440 C steel alloys, used for comparison testing as described hereinbelow, are also given in Table II. The resulting ingot of Ex. 1 was stress relieved, cut to provide a 12 in (about 30 cm) piece which was forged from a soak temperature of 2050° F. (about 1120° C.), to a 3.5 in × 4.25 in (about 8.9 cm × 10.8 cm) rectangular bar and then cooled in vermiculite to room temperature. The forged bar was annealed at 1200° F. (about 650° C.) for 56 h, then air cooled. The hardness of the annealed bar was found to be HRC 25.0. Here and throughout this application, unless otherwise indicated all hardnesses are in the Rockwell C hardness scale (HRC).

Case hardened and heat treated specimens of Example 1 were prepared for surface hardness testing; the specimens were taken from a portion of the annealed bar, heated at 1900° F. (about 1040° C.) for 1 h in an air furnace to oxidize the specimen surface, then air cooled to room temperature. These specimens were case hardened by carburizing; the specimens were heated at 1700° F. (about 925° C.) for 7 h at a carbon potential of 1.2 w/o then air cooled to room temperature. The carburized specimens were hardened by austenitizing at 1900° F. (about 1040° C.) in salt for 0.25 h, oil quenching, deep freezing at −100° F. (about −73° C.) for 0.5 h, then air cooling to room temperature. Following hardening, the specimens were tempered at 600° F. (about 315° C.) for two successive periods of 2 h each, with air cooling to room temperature after each of the heating periods. The tempered surface hardness of each specimen was determined to be HRC 62.

The case wear resistance of Example 1 was tested using a crossed cylinder wear test (ASTM G 83). In this test, duplicate 0.5 in (1.27 cm) diameter bar specimens of Example 1 (Table II) were carburized and heat treated as described in connection with the hardness specimens. The case of each bar was found to have a surface hardness of HRC 61. Each bar was placed in contact with, and in a perpendicular relationship relative to, a 0.5 in (1.27 cm) diameter bar of commercially purchased standard AISI 4340 steel, having the nominal composition indicated in Table II, hardened to HRC 31. The specimens of Example 1 served as the rotating member, while the AISI 4340 bar served as the stationary member in duplicate tests run at a speed of 600 revolutions per minute (rpm) for 40,000 revolutions with a load of 161 bs (about 7.3 kg). The test results, listed in Table III, compare the wear resistance of the present alloy/AISI 4340 system against that of an identically tested system in which the rotating member was a 0.5 in (1.27 cm) diameter carburized bar of commercially purchased standard AISI 8620 steel hardened to HRC 61. Because of the use of carburized AISI 8620 bearings and AISI 4340 bearing cages in some current engine designs, the 8620/4340 system was used for wear resistance comparisons.

TABLE III

|  | HRC | Specimen Loss (mm³) | 4340 Loss (mm³) | Total Loss (mm³) |
|---|---|---|---|---|
| Ex. 1 | 61 | 0.946 | 0.191 | 1.137 |
|  |  | 0.583 | 0.166 | 0.749 |
| 8620* | 61 | 1.137 | 0.548 | 1.685 |
|  |  | 1.162 | 0.587 | 1.749 |

*AISI 8620 was processed same as Ex. 1 except that preoxidizing was not required and it was austenitized for 0.25 h in salt at 1550 F. (about 845 C.), oil quenched, tempered at 400 F. (about 205 C.) for 2 h, deep frozen at −320 F. (about −195 C.) for 0.25 h, tempered 350 F. (about 175 C.) for 1 h As seen in Table III, the total loss data indicate that the alloy of the present invention exhibits significantly better wear resistance than carburized AISI 8620 steel.

Duplicate specimens of both Example 1, and AISI Type 440C, having the compositions listed in Table II, were comparison tested for pitting potential in 100 parts per million (ppm) NaCl solution. The specimens of Example 1 were carburized and heat treated as described in connection with the cross cylinder wear tests, while the Type 440C specimens were heat treated as indicated below in Table IV.

TABLE IV

| Alloy | Pitting Potential (mV) | Average |
|---|---|---|
| Ex. 1 | +0.084 | +0.131 |
|  | +0.168 |  |
| 440C* | +0.382 | +0.393 |
|  | +0.404 |  |

*Austenitized in salt at 1900 F. (about 104 C.), oil quenched, deep frozen at −100 F. (about −73 C.) for 0.5 h, and tempered at 375 F. (about 190 C.) for 1 h Since positive numbers between about 0 and +1.000 millivolt (mV) indicate comparable pitting resistance in this test, the results listed in Table IV show that the present alloy resists pitting similarly to Type 440C.

Specimens of both the present alloy and commercially purchased standard AISI Type 440C, processed as described hereinabove, were subjected to humidity corrosion testing wherein 1 in (about 2.5 cm) diameter bar specimens were machined to a 45° cone at one end and were subjected to 95% humidity at 95° F. (about 35° C.) for 200 h. The present alloy resisted corrosion very well, having corroded similarly to Type 440C; both alloys exhibited approximately 5% surface corrosion at the conclusion of the test.

In testing the properties of the core analysis, specimens for the various tests were cut from the annealed bar and then pseudocarburized, that is, subjected to the carburizing treatment except that an inert cover gas ($N_2$ or Ar) was substituted for the carburizing gas thereby replicating as closely as possible the processing conditions to which the carburized specimen cores were subjected.

Standard (ASTM E 21) tensile strength test specimens were cut from the annealed bar of Example 1 and rough machined to 0.005 in (about 0.013 cm) oversize in the gage section. The specimens were cut such that their longitudinal axes were oriented either along or transverse to the direction of metal flow during forging of the bar. The specimens were pseudocarburized at 1700° F. (about 925° C.) for 7 h, air cooled to room temperature, austenitized 0.25 h in salt at 1900° F. (about 1040° C.), oil quenched, deep frozen at −100° F. (about −73° C.) for 0.5 h, and tempered at 600° F. (about 315° C.) using a two-step cycle (2 h/air cooled to room temperature/2 h/air cooled to room temperature). The specimen gage sections were then polished to 0.252 in (about 0.640 cm) in diameter before testing. Results from duplicate room temperature tensile tests are shown in Table V, including yield point (Y.P.) and ultimate tensile strength (U.T.S.), both given in thousands of pounds per square inch (ksi) and in megaPascals (MPa), as well as the percent elongation (% El.) and the percent reduction in cross-sectional area (% R.A.).

TABLE V

| Ex. 1 | HRC | Y.P. ksi(MPa) | U.T.S. ksi(MPa) | % El. | % R.A. |
|---|---|---|---|---|---|
| L* | 39.5 | 118.3 (815.6) | 182.5 (1256.9) | 21.7 | 71.0 |
|  | 39.5 | 120.3 (829.4) | 182.9 (1261.1) | 19.4 | 70.0 |
| T* | 39.5 | No Data | 183.7 (1266.6) | 17.1 | 55.3 |
|  | 39.5 | 118.3 (815.6) | 182.3 (1256.9) | 18.8 | 60.3 |

*L-Specimen longitudinal axis along direction of metal flow in forged and annealed bar
*T-Specimen longitudinal axis transverse to direction of metal flow in forged and annealed bar Duplicate standard (ASTM E 399) 1.25 in (about 3.18 cm) compact tension specimens for fracture toughness testing were cut from the annealed bar such that their longitudinal axes were oriented along the direction of metal flow during forging, and rough machined 0.010 in (about 0.025 cm) oversize. The specimens were then pseudocarburized and heat treated as described hereinabove for tensile strength test specimens and then finish machined to standard size. Valid $K_{Ic}$ results could not be determined since the specimens were too small for such a ductile alloy. However, the $K_Q$ results listed in Table VI were determined, showing very good core fracture toughness. The terms $K_{Ic}$ and $K_Q$ are used herein as defined in ASTM E 399.

TABLE VI

| Ex. 1 | HRC | $K_Q$ ksi $\sqrt{in}$ (MPa $\sqrt{m}$) |
|---|---|---|
| L* | 39.0 | 135.7 (149.1) |
|  | 39.0 | 148.1 (162.7) |

*L-Specimen longitudinal axis along direction of metal flow in forged and annealed bar Longitudinal (L) and transverse (T) standard (ASTM E 23) Charpy V-notch (CVN) specimens of Example 1 were rough machined 0.020 in (about 0.051 cm) oversize and then heat treated and pseudocarburized in the manner hereinbefore described for tensile strength test specimens. After heat treating, the specimens were finish machined, notched and tested for impact toughness at 32° F. (0° C.), 78° F. (about 25° C.), and 212° F. (100° C.) yielding the results shown in Table VII.

TABLE VII

| Ex. 1 | Test Temp. F.(C.) | HRC | CVN Average ft-lb(J) | |
|---|---|---|---|---|
| L* | 32(0) | 39.5 | 123(167) | 111(150) |
|  |  |  | 99(134) |  |
| T* | 32(0) | 39.5 | 50(68) | 49(66) |
|  |  |  | 47(64) |  |
| L* | 78(25) | 39.5 | 129(175) | 125(169) |
|  |  |  | 120(163) |  |
| T* | 78(25) | 40.0 | 78(106) | 69(94) |
|  |  |  | 59(80) |  |

TABLE VII-continued

| Ex. 1 | Test Temp. F.(C.) | HRC | CVN Average ft-lb(J) | |
|---|---|---|---|---|
| L* | 212(100) | 39.5 | 124(168) | 119(161) |
|  |  |  | 114(155) |  |
| T* | 212(100) | 39.5 | 45(61) | 62(84) |
|  |  |  | 79(107) |  |

*L-Specimen longitudinal axis along direction of metal flow in forged and annealed bar
T-Specimen longitudinal axis transverse to direction of metal flow in forged and annealed bar These results indicate that the present invention exhibits excellent core impact toughness, especially along the direction of metal flow during forging.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A case hardenable, corrosion resistant alloy consisting essentially of, in weight percent, about

|  | w/o |
|---|---|
| C | 0.05–0.09 |
| Mn | 1.5 max. |
| Si | 1 max. |
| Cr | 11–15 |
| Mo | 1–3 |
| Ni | 1.5–3.5 |
| Co | 4–8 |
| V | 0.1–1 |
| P | 0.010 max. |
| S | 0.005 max. |
| N | 0.04 max. | the balance essentially iron, and in which nitrogen, when present, is a substitute for carbon on a 1-for-1 basis.

2. The alloy as recited in claim 1 wherein 3(w/o Cr)+6(w/o Si)+2.5(w/o Mo)+6(w/o V) −25(w/o C+N)−6(w/o Ni)−2(w/o Mn) −2(w/o Co)−21≦0.

3. The alloy as recited in claim 1 containing at least about 0.06 w/o carbon and no more than about 0.002 w/o nitrogen.

4. The alloy as recited in claim 3 containing no more than about 0.7 w/o silicon.

5. The alloy as recited in claim 3 containing no more than about 3.0 w/o nickel.

6. The alloy as recited in claim 3 containing no more than about 7 w/o cobalt.

7. The alloy as recited in claim 3 containing no more than about 0.8 w/o vanadium.

8. The alloy as recited in claim 1 containing about

|  | w/o |
|---|---|
| C | 0.06–0.09 |
| Mn | 0.25–1.25 |
| Si | 0.1–0.7 |
| Cr | 12–14 |
| Mo | 1.5–2.5 |
| Ni | 2.0–3.0 |
| Co | 4–7 |
| V | 0.4–0.8 |
| N | 0.002 max. |

9. The alloy as recited in claim 8 wherein 3(w/o Cr)+6(w/o Si)+2.5(w/o Mo)+6(w/o V) −25(w/o C+N)−6(w/o Ni)−2(w/o Mn) −2(w/o Co)−21≦0.

10. The alloy as recited in claim 3 containing no more than about 0.08 w/o carbon.

11. The alloy as recited in claim 8 containing about

|  | w/o |
|---|---|
| C | 0.06–0.08 |
| Mn | 0.5–1 |
| Si | 0.2–0.6 |
| Cr | 12.75–13.5 |
| Mo | 1.5–2.0 |
| Ni | 2.25–2.75 |
| Co | 4.75–5.75 |
| V | 0.5–0.7 |
| N | 0.002 max. |

12. The alloy as recited in claim 11 wherein 3(w/o Cr)+6(w/o Si)+2.5(w/o Mo)+6(w/o V) −25(w/o C+N)−6(w/o Ni)−2(w/o Mn) −2(w/o Co)−21≦0.

13. A worked and heat-treated article formed from the alloy of claim 1.

14. A worked and heat-treated article formed from the alloy of claim 2.

15. A worked and heat-treated article formed from the alloy of claim 8.

16. A worked and heat-treated article formed from the alloy of claim 9.

17. A worked and heat-treated article formed from the alloy of claim 11.

18. A worked and heat-treated article formed from the alloy of claim 12.

19. A case hardened article, formed from an alloy containing, in weight percent, about

|  | w/o |
|---|---|
| C | 0.06–0.08 |
| Mn | 0.5–1 |
| Si | 0.2–0.6 |
| Cr | 12.75–13.5 |
| Mo | 1.5–2.0 |
| Ni | 2.25–2.75 |
| Co | 4.75–5.75 |
| V | 0.5–0.7 |
| N | 0.002 max. | the balance essentially iron, said article having a core and a case, said core, at room temperature, being essentially ferrite-free and having a hardness of at least about HRC 35, a longitudinal Charpy V-notch impact toughness of at least about 60 ft-lb (about 87J), a fracture toughness of at least about 80 ksi √in (about 88 MPa √m), said case having, at room temperature, a hardness of at least about HRC 60, a hot hardness at about 400° F. (about 205° C.) of at least about HRC 60; good metal-to-metal wear resistance and essentially no retained austenite.

20. A case hardened article, formed from an alloy containing, in weight percent, about

|  | w/o |
|---|---|
| C | 0.05–0.10 |
| Mn | 1.5 max. |
| Si | 1 max. |
| Cr | 11–15 |
| Mo | 1–3 |
| Ni | 1.5–3.5 |
| Co | 3–8 |

-continued

|   | w/o |
|---|---|
| V | 0.1–1 |
| P | 0.010 max. |
| S | 0.005 max. |
| N | 0.04 max. | the balance being essentially iron, and in which nitrogen when present is a substitute for carbon on a 1-for-1 basis, said article having a core and a case, said core at room temperature being essentially ferrite-free and having a hardness of at least about HRC 35, a longitudinal Charpy V-notch impact toughness of at least about 60 ft-lb (about 87J), a fracture toughness of at least about 80 ksi $\sqrt{}$in (about 88 MPa $\sqrt{}$m), said case having at room temperature a hardness of at least about HRC 60, a hot hardness at about 400° F. (about 205° C.) of at least about HRC 60, good metal-to-metal wear resistance and essentially no retained austenite.

* * * * *

UNITED STATES PATENT AND TRADEMARK OFFICE
CERTIFICATE OF CORRECTION

PATENT NO. : 5,002,729

DATED : March 26, 1991

INVENTOR(S) : DAVID E. WERT and RAYMOND M. HEMPHILL

Page 1 of 2

It is certified that error appears in the above-identified patent and that said Letters Patent is hereby corrected as shown below:

Column 2:

Line 2, " $81J$" should read -- $81J$),--; and

Line 3, "80 ksi in" should read --80 ksi $\sqrt{in}$--, and "(about 88MPa" should read --(about 88MPa $\sqrt{m}$),--

Column 3:

Line 55, "Ms" should read --$M_s$--.

Column 4:

Line 9, "Ms" should read --$M_s$--;

Line 34, "Ms" should read --$M_s$--; and

Line 60, "(vIM)" should read --(VIM)--.

Column 5:

Line 4, "(Ac1)" should read --($A_{c1}$)--;

Table II, column headed "AISI 4340 (Nom.)" the entries for "Co" and "V" should each read --*--;

column headed "AISI 8620 (Nom.)" the entries for "Co" and "V" should each read --*--; and column headed "AISI 440C (Nom.)" the entries for "Ni", "Co", and "V" should each read --*--.

Column 6:

Line 61, "161 bs" should read --16lbs--.

UNITED STATES PATENT AND TRADEMARK OFFICE
CERTIFICATE OF CORRECTION

PATENT NO. : 5,002,729

DATED : March 26, 1991

INVENTOR(S) : DAVID E. WERT and RAYMOND M. HEMPHILL

It is certified that error appears in the above-identified patent and that said Letters Patent is hereby corrected as shown below:

Column 10:

Line 52, "ksi $\sqrt{}$in " should read --ksi $\sqrt{in}$ --; and

Line 53, " $\sqrt{}$m " should read -- $\sqrt{m}$ --.

Column 12:

Line 5, "ksi $\sqrt{}$in " should read --ksi $\sqrt{in}$ --, and

" $\sqrt{}$m " should read -- $\sqrt{m}$ --.

Signed and Sealed this

Twenty-sixth Day of January, 1993

Attest:

STEPHEN G. KUNIN

*Attesting Officer*  *Acting Commissioner of Patents and Trademarks*